United States Patent [19]
Suzuki

[11] Patent Number: 5,260,890
[45] Date of Patent: Nov. 9, 1993

[54] OVERFLOW DETECTION SYSTEM AND ITS CIRCUIT FOR USE IN ADDITION AND SUBTRACTION

[75] Inventor: Kazumasa Suzuki, Tokyo, Japan
[73] Assignee: NEC Corporation, Tokyo, Japan
[21] Appl. No.: 901,859
[22] Filed: Jun. 22, 1992

[30] Foreign Application Priority Data
Jun. 28, 1991 [JP] Japan .................................. 3-185552

[51] Int. Cl.⁵ .......................... G06F 7/38; G06F 11/00
[52] U.S. Cl. ...................................... 364/745; 364/737
[58] Field of Search ............... 364/715.01, 736.5, 745, 364/737

[56] References Cited
U.S. PATENT DOCUMENTS

| | | | |
|---|---|---|---|
| 4,379,338 | 4/1983 | Nishitani et al. | 364/745 |
| 4,706,209 | 11/1987 | Picco | 364/745 |
| 4,768,160 | 8/1988 | Yokoyama | 364/745 |
| 4,941,119 | 7/1990 | Moline | 364/745 |

Primary Examiner—Jerry Smith
Assistant Examiner—Chuong D. Ngo
Attorney, Agent, or Firm—Laff, Whitesel, Conte & Saret

[57] ABSTRACT

In an overflow detection circuit for $A+B$ operation, an inverter outputs a value $V_B'$ comprising inverted bits of a numeric part of an addend B. A comparator receives as an input a numeric part $V_A$ of an augend A and an output $V_B'$ of the inverter, and responsive thereto outputs a signal C indicating whether or not $V_A > V_B'$ is given. Sign parts $S_A$ and $S_B$ of A and B and the output C of the comparator are inputted into the a decoder and an overflow signal "0" is outputted. The decoder is a circuit which outputs "1" when $S_A$ and $S_B$ are "0" and $V_A$ ($V_A > V_B'$) is large and when $S_A$ and $S_B$ are "1" and $V_A$ is small ($VA = V_B'$), and output "0" in other cases. If the comparator is a circuit for determining $V_A \geq V_B'$, the overflow of $A+B+1$ can be detected. Thus, the overflow of the result of operation can be detected earlier than an adder and a substracter output the results.

4 Claims, 8 Drawing Sheets

PRIOR ART

OVERFLOW DETECTION SYSTEM AND ITS CIRCUIT FOR USE IN ADDITION AND SUBTRACTION

BACKGROUND OF THE INVENTION

1. Field of the Invention The present invention relates to an overflow detection system and its circuit for use in addition and subtraction by a digital operating unit.

2. Description of the Prior Art

Conventionally, an overflow signal as to the results of addition and subtraction of two digital values has been detected using a carry signal obtained as a result of addition and subtraction or during operation.

FIG. 1 shows an adder for adding digital values expressed as n-bit 2's complements according to the ripple carrying system. $a_i$ is the ith value of augend A, $b_i$ is the (i)th value of addend B, $c_i$ is the (i)th carry output signal, and $s_i$ is the (i)th sum output. $a_{n-1}$ and $b_{n-1}$ are respectively a sign part of augend A and addend B and the following bits form a numeric part. The adder body is formed by connecting n sets of full adders 100 each of which enters the (i)th bit values of the augend and addend and the (i−1)th bit carry signal output and outputs the (i)th bit sum and the carry signal. The overflow signal is obtained by the exclusive OR circuit 101 which uses the carry signal $c_{n-1}$ from the sign part and the carry signal $c_{n-2}$ from the MSD of the numeric part as inputs.

Also in case the expression method of negative numerals other than the 2's complement is adopted, the overflow of the result of addition is detected the carry signal from the sign part and the carry signal from the MSD of the numeric part.

However, the conventional overflow detection method is disadvantageous in that the overflow has been determined at the same time or after the result of sum was obtained since the overflow has been detected from the result of addition and the carry signal.

SUMMARY OF THE INVENTION

An object of the present invention is to provide an overflow detection system and its circuit which detects an overflow signal independent of an adder.

The overflow detection system of the first invention is characterized in that, in addition and subtraction of two digital values respectively having a sign which are carried out by addition, an overflow as to the results of addition and subtraction is detected from the result of inversion of bits of the numeric part of the addend, the numeric part of the augend and the values of the sign parts of the two digit values in case of addition and from the result of comparison of the numeric part of the subtrahend and the numeric part of the minuend, inversion of the sign part of the subtrahend and the value of the sign part of the minuend in case of subtraction, respectively as the case where the sign parts of two digit values are positive and the numeric part of the augend or the minuend is larger than the numeric part of the addend or the subtrahend and the case where the sign parts of two digit values are negative and the numeric part of the augend or the minuend is smaller than the numeric part of the addend or the subtrahend.

The overflow detection circuit of the second invention, comprising an inverter for inputting the numeric part of the addend and outputting the inversion values of bits, a comparator for inputting the outputs of the numeric part of the augend and the inverter and outputting the result of comparison of input digit values and a decoder which uses the sign parts of the augend and the addend and the output of the above comparator as inputs, is characterized to detect the overflow of the result of addition by the system according to the first invention.

The overflow detection circuit of the third invention, comprising a comparator for inputting the numeric parts of the minuend and the subtrahend and outputting the result of comparison of input digit values, an inverter for using the sign part of the subtrahend as input and a decoder which uses the sign part of the minuend, the output of the above inverter and the output of the above comparator as inputs, is characterized to detect the overflow of the result of subtraction by the system according to the first invention.

DETAILED DESCRIPTION OF PREFERRED EMBODIMENTS

The following description explains the overflow detection method according to the present invention, referring to FIGS. 3 to 6. In this case, an example of 4-bit digit values is shown and the generality is not lost and the case of n-bit digit values can be similarly considered.

Figure 3:
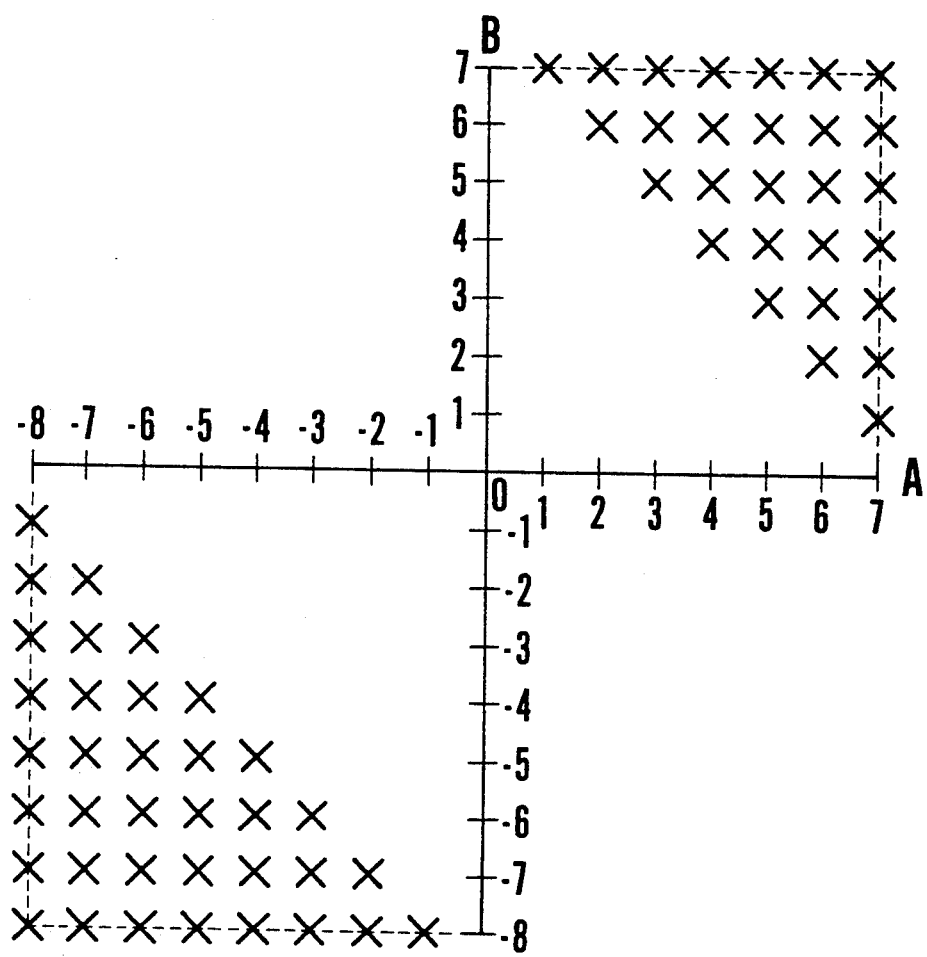
FIG. 3 is a diagram showing the overflow range when A+B operation of 4-bit digit values is carried out.
Figure 4:
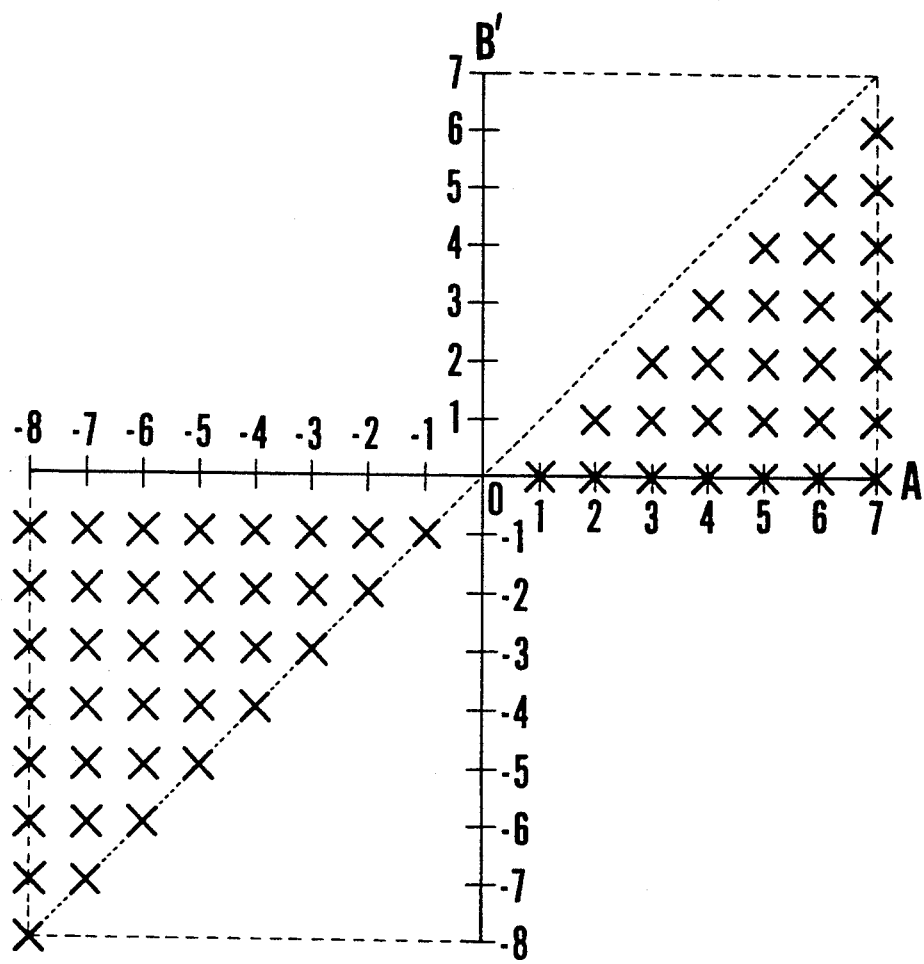
FIG. 4 is a diagram showing the image of the overflow range when the numeric part of addend B is inverted.

FIG. 3 is a diagram prepared by entering "x" in the coordinates when the result of A+B causes an overflow where augend A is plotted on the abscissa and addend B is plotted on the ordinate. The range where an overflow occurs exists in the upper right part of the line connecting the point of A=7 and B=1 (hereafter denoted as (7, 1)) and (1, 7) and the lower left part of the line connecting (−8, −1) and (−1, −8). Therefore, it is attempted to invert the bits of only the numeric part while the sign of addend B is kept as is. For example, since 7 is $0111_2$ in the binary value, it becomes $0000_2$, that is, 0 as a result of bit inversion except the MSD bit showing the sign and therefore (1, 7) is shifted to 1, 0). Similarly, −7that is $1001_2$ is inverted to $1110_2$, that is, −2 and therefore (−2, −7) is shifted to (−2, −2). FIG. 4 shows a diagram when the above operation is performed for all Bs and the range where the overflow occurs is image-displayed. In this diagram, the broken line shows the point of A=B. From this diagram, it is known that, the bits of the numeric part of B are inveretd, the range of A>B is a combination of A and B which causes the overflow when A and B are positive, that is, in the first quadrant shown in FIG. 4 and the range of A≦B is a combination of A and B which causes the overflow when A and B are negative, that is, in the third quadrant shown in FIG. 4. The overflow does not occur when one of A and B is a positive value and the other is a negative value. A combination of A and B which causes the overflow can be determined from the result of comparison of the value obtained by inverting the numeric part of B and the numeric part of A, using the inverter and the sign parts of two digit values.

Figure 5:
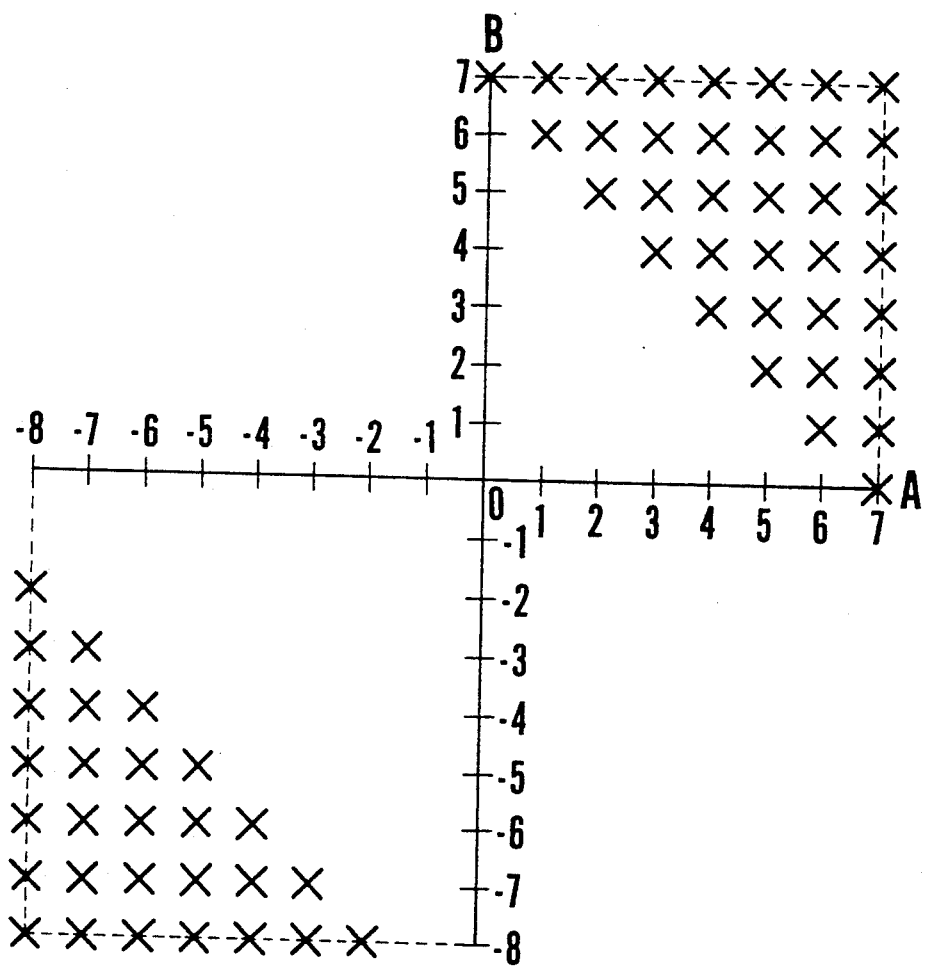
FIG. 5 is a diagram showing the overflow range when A+B+1 operation with 4-bit digit values is carried out.
Figure 6:
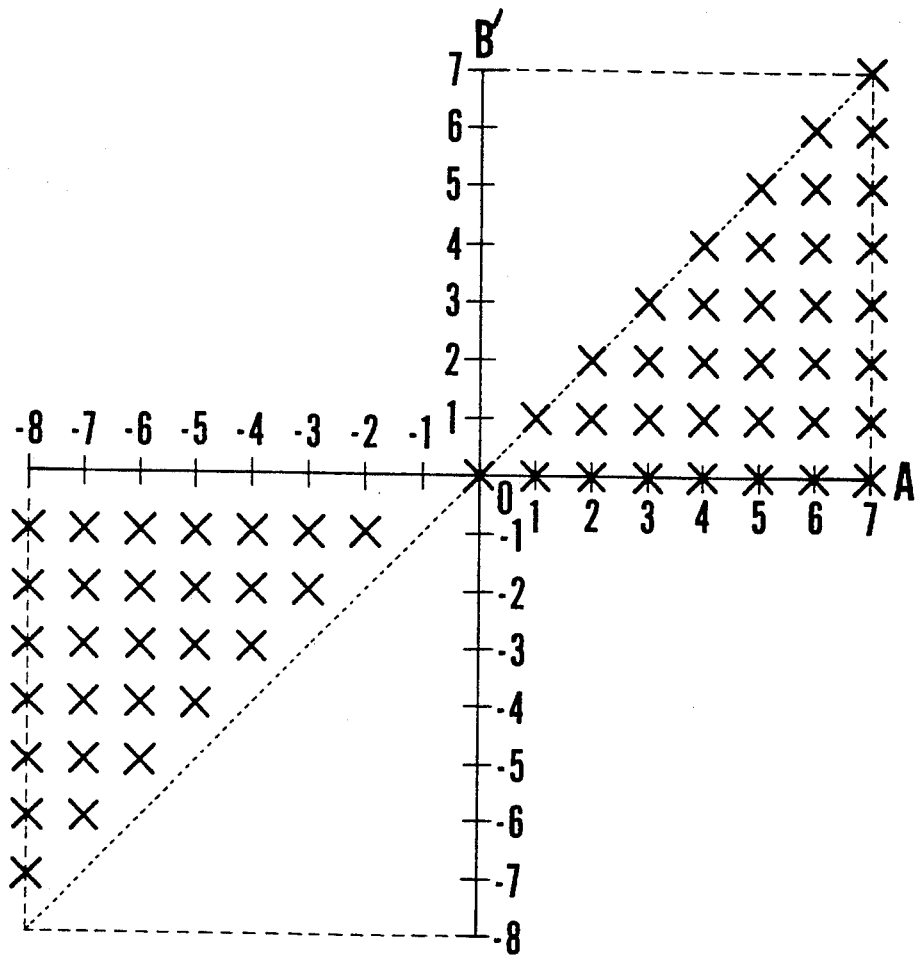
FIG. 6 is a diagram showing the image of the overflow range when the numeric part of addend B is inverted.

FIGS. 5 and 6 show the similar operation to FIGS. 3 and 4 as to A+B+1. In this case, as shown in FIG. 5, the upper right part of the line connecting (7, 0) and (0, 7) and the lower left part of the line connecting (−8, −2) and (−2, −8) are the range of the combination of A and B where the overflow is caused.

The image of the range where the overflow is caused by an operation for inverting the bits of the numeric part of B is shown in FIG. 6. The broken line shows A=B. As known from FIG. 6, A≧B in the first quadrant is the range where the overflow is caused and the range of A<B in the third quadrant is the combination of A and B by which the overflow is caused. Thus, also in case of A+B+1, the overflow can be detected from the result of comparison of the inverted value of bits of the numeric part of B and the numeric part of A and the values of the sign parts of two digit values.

As described above, the overflow can be detected by using the inverter, the comparator and the decoder which uses the sign parts of two digit values and the result of comparison without addition.

Figure 1:
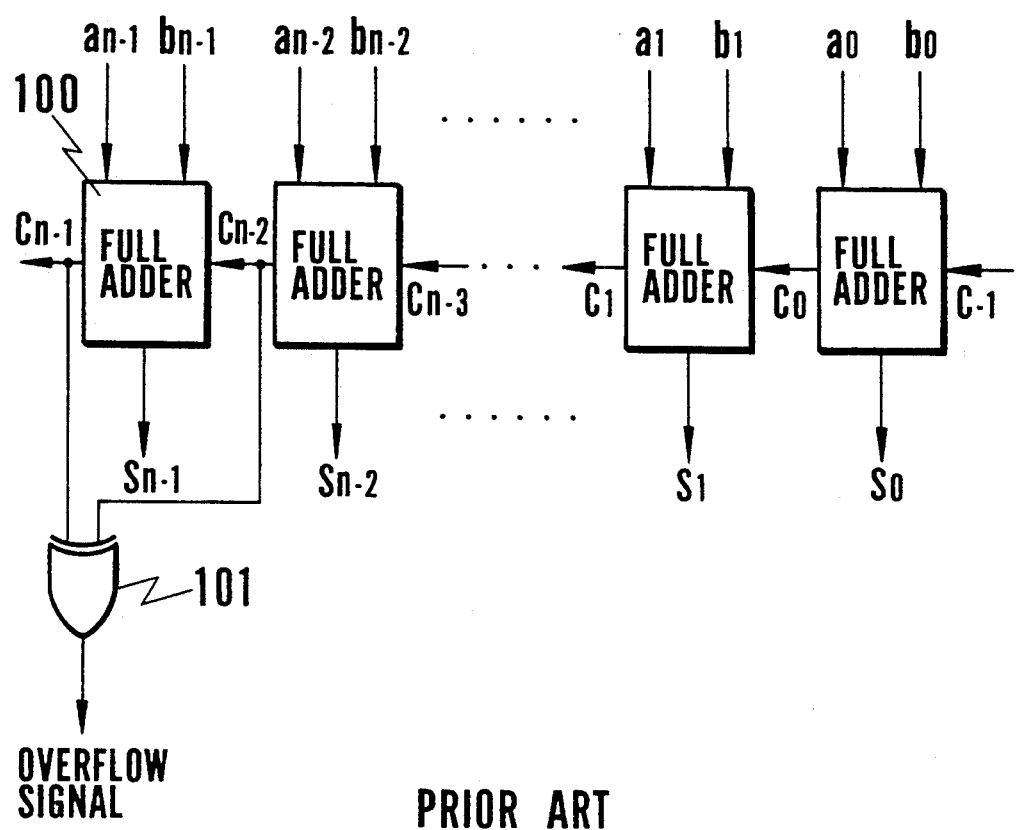
FIG. 1 is a diagram showing the detection of overflow of the conventional adder.
Figure 2:
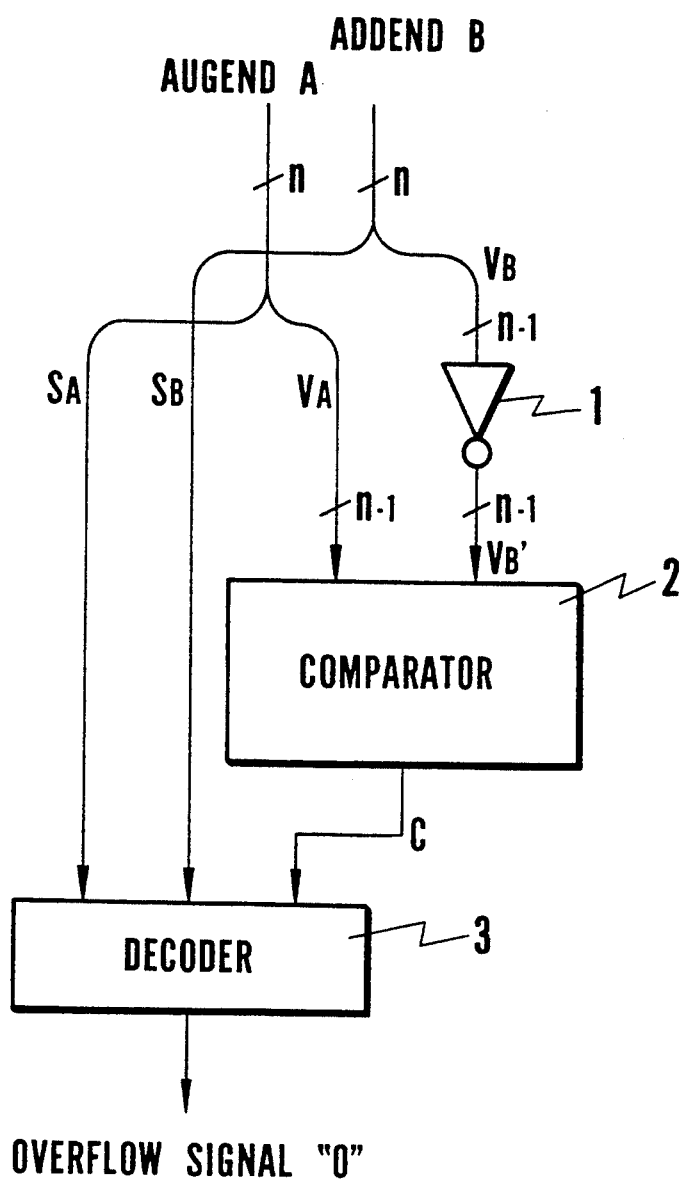
FIG. 2 is a block diagram showing an embodiment of the overflow detection circuit according to the present invention.

FIG. 2 shows an embodiment of the overflow detection circuit which implements the system according to the present invention. The inverter 1 outputs the value $V_B'$ of the inverted bits of the value $V_B$ of addend B. The comparator 2 inputs the numeric part $V_A$ of augend A and the output $V_B'$ of the inverter and outputs the signal C indicating whether or not $V_A > V_B'$. The sign parts $S_A$ and $S_B$ of A and B and the output C of the comparator are inputted into the decoder, which determines a combination of A and B which permits x in FIG. 4 and outputs the overflow signal C. The decoder is a circuit which outputs 1 when $S_A$ and $S_B$ are 0 with $V_A > V_B'$ and $S_A$ and $S_B$ are 1 with $V_A \leq V_B'$, that is, when $V_A > V_B'$ is not permitted and 0 in other cases. In this case, the overflow of A+B can be detected.

If the output of the comparator 2 is assumed as a signal indicating $V_A \geq V_B'$ or not, the overflow in case of A+B+1 can be detected. In this case, the decoder is a circuit which outputs 1 when $S_A$ and $S_B$ are 0 with $V_A > V_B'$ and $S_A$ and $S_B$ are 1 with $V_A < V_B'$, that is, when $V_A \geq V_B'$ is not permitted and 0 in other cases. Thus, the decoder can have the same circuit as in case of A+B except that the meaning of the output of the comparator is different.

Figure 7:
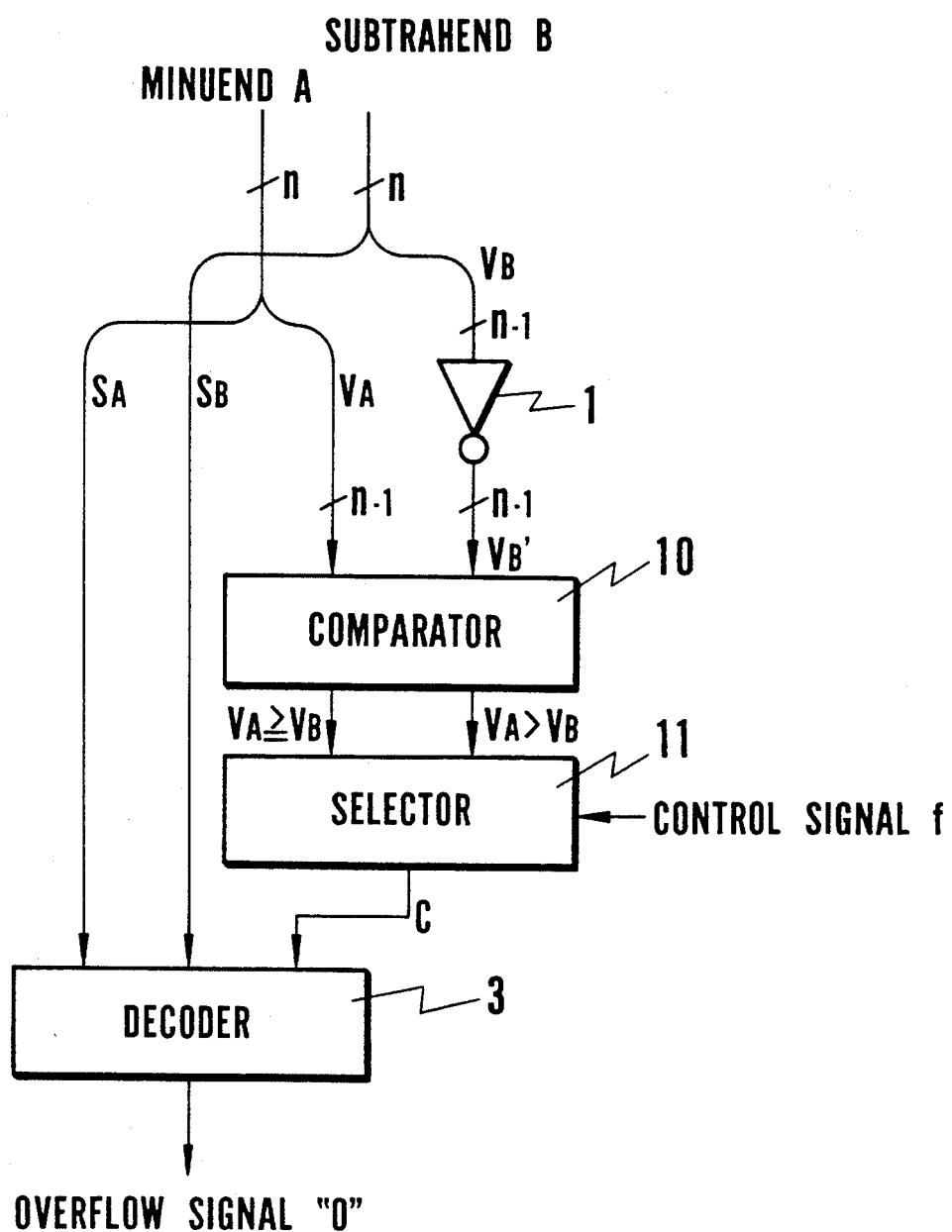
FIG. 7 is a block diagram showing another embodiment of the overflow detection circuit according to the present invention.

FIG. 7 shows another embodiment of the overflow detection circuit in which the overflow detection system according to the present invention is embodied. If the comparator 2 shown in FIG. 2 is changed over to the comparator 10 capable of detecting $V_A > V_B'$ and $V_A \geq V_B'$ by the selector 11, the overflow detection circuit capable of detecting the overflow in two kinds of additions of A+B and A+B+1 is obtained.

In subtraction, the bits of addend B are inverted and A−B is obtained by calculating A+B̄+1. In case of detecting an overflow in subtraction, the inverted bits of the value of B can be inputted in B shown in FIG. 2 and an overflow of A+B+1 can be detected.

Figure 8:
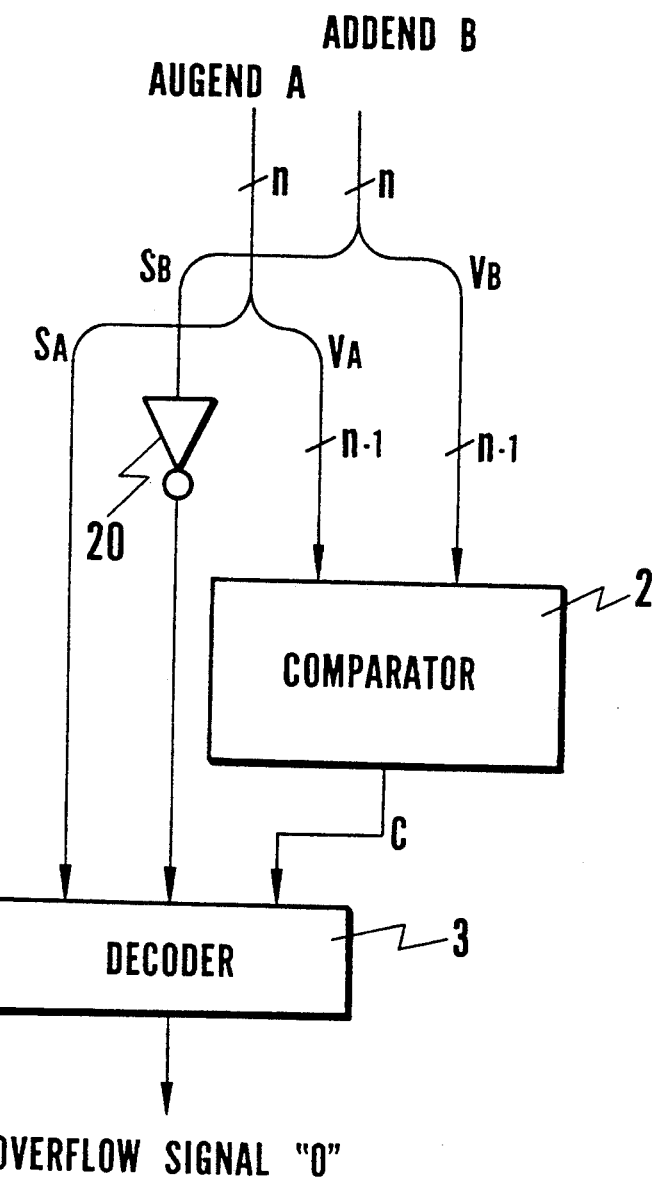
FIG. 8 is a block diagram showing another further embodiment of the overflow detection circuit according to the present invention.

FIG. 8 shows an embodiment of the carry detection circuit for subtraction in which the overflow detection system according to the present invention is embodied. An overflow in subtraction of A−B can be detected by inverting the sign part, not the numeric part, of B by the inverter 20 and $V_A \geq V_B'$ by the comparator 2 to detect the overflow of A+B+1 even though the inverted bits of B are not inputted.

As described above, the overflow detection system and its circuit according to the present invention allow to detect the overflow of the results of addition and subtraction by using an independent circuit, not from the result of addition or substraction or the carry signal obtained during addition or subtraction. This circuit is a simpler circuit than the adder and the subtracter and can earlier detect whether or not the result of addition or subtraction overflows than the output of the result by the adder and the subtracter.

What is claimed is:

1. An overflow detection method for use in an addition of two digital values, each value having a sign part and a numeric part, an overflow being recognized in addition to a recognition of an addend and an augend; said method comprising the steps of:
    (a) Detecting conditions where both a sign part of an addend and a sign part of an augend are positive and a numeric part of an augent is larger than a value of inverted bits of a numeric part of the addend;
    (b) Detecting conditions where both the sign part of the addend and the sign part of the augend are negative and the numeric part of the augend is equal to or smaller than a value of inverted bits of the numeric part of the addend; and
    (c) Giving a signal indicating the condition that is detected.

2. An overflow detection method for use in a subtraction of two digital values, each value having a sign part and a numeric part, an overflow being recognized in a subtraction of a subtrahend and a minuend, said method comprising the steps of:
    a) Detecting conditions where both an inverted sign part of a subtrahend and a sign part of a minuend are positive and a numeric part of the minuend is equal to or larger than a numeric part of the subtrahend;
    (b) Detecting condition where both the inverted sign part of the substrahend and the sign part of the minuend are negative and the numeric part of the minuend is smaller than the numeric part of the subtrahend; and
    (c) giving a signal indicating the condition that is detected.

3. An overflow detection circuit for detecting an overflow in an addition of two digital values, each of said values having a sign part and a multibit numeric part, said overflow detection circuit comprising:
    inverter means for inverting each bit of a numeric part of an addend;
    comparator means for comparing an output of said inverter means with a numeric part of the augend and for outputting only a result of said comparison in terms of large or small; and decoder means for outputting an overflow signal in response to both a sign part of the addend and a signal part of the augend being positive and the numeric part of the augend being larger than the output of said inverter means and for outputting an overflow signal in response to both the sign part of the addend and the sign part of the augend being negative and the numeric part of the augend being smaller than he output of said inverter means.

4. An overflow detection circuit for detecting an overflow in a subtraction of two digital values, each of said values having a sign part and a multibit numeric part, said overflow detection circuit comprising:

inverter menus for inverting each bit of a sign part of a subtrahend;

comparator means for comparing a numeric part of the subtrahend with a numeric part of a minuend and for outputting only a result of the comparison in terms of large or small; and decoder means for outputting an overflow signal in response to both an output of said inverter means and a sign part of the minuend being positive and the numeric part of the minuend being larger than a numeric part of said subtrahend and in response to both the output of said inverter means and the sign part of the minuend being negative and the numeric part of the minuend being smaller than the numeric part of said subtrahend.

* * * * *